Sept. 11, 1923.　　　　　　　　　　　　　　　　　　　1,467,402
A. THOMAS
MECHANISM FOR GRINDING CRANK SHAFTS
Filed Sept. 20, 1922
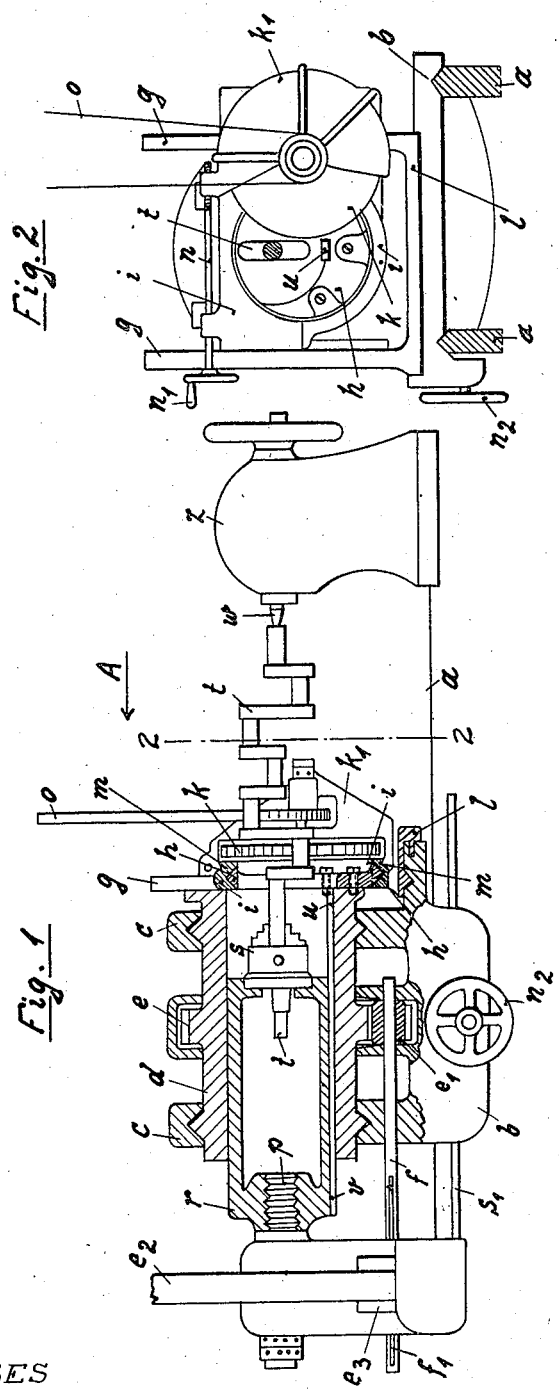
WITNESSES
INVENTOR:
August Thomas.
By
Attys Patented Sept. 11, 1923.

1,467,402

UNITED STATES PATENT OFFICE.

AUGUST THOMAS, OF BERLIN-SCHONEBERG, GERMANY, ASSIGNOR TO DEUTSCHE WERKE AKTIENGESELLSCHAFT, OF BERLIN, GERMANY, A GERMAN CORPORATION.

MECHANISM FOR GRINDING CRANK SHAFTS.

Application filed September 20, 1922. Serial No. 589,478.

*To all whom it may concern:*

Be it known that I, AUGUST THOMAS, a citizen of the German Republic, residing at Berlin-Schoneberg, Germany, have invented certain new and useful Improvements Relating to Mechanism for Grinding Crank Shafts, of which the following is a specification.

This invention relates to mechanism for grinding crankshafts, and its object is to provide mechanism for grinding revolving crankshafts whereby the tool, that is the grinding disc, in dressing the crank-pin, is made to follow same through the intervention of an adjustably secured eccentric at the front of a rotary cylinder and which carries an adjustably disposed rotary grinding disc on the eccentric strap, which latter is seated in a slide in which it is enabled to move in its upright position, said slide being laterally movable on the carrier-slide of the slide-rest.

An illustration of the invention is shown in the accompanying drawings, in which:—

Fig. 1 is a sectional side elevation, and Fig. 2 transverse section on line 2—2 looking in the direction shown by the arrow A.

In this illustrative embodiment of the invention, the driving drum rotatably mounted in a casing of the slide-rest, is longitudinally slidable upon an inner drum which is rotated by said driving drum. The inner drum is mounted by one end on a spindle running in a bearing, while the other end of said drum carries the chuck for the crankshaft. The free end of the crankshaft is held by the centre-pin of the sliding puppet. The driving drum carried by the slide-rest has peripheral teeth in engagement with a toothed pinion driven by belt-pulley. The grinding disc is separately driven by a belt-drive.

Upon the bed $a$, $a$ of the machine is mounted the longitudinally movable slide-rest $b$ provided with two bearing rings $c$ for the driving drum $d$. The drum has a toothed ring $e$ with which engages a toothed pinion $e^1$. The pinion is driven through the intervention of a belt $e^2$ and pulley $e^3$ in which latter the shaft $f$ with its long feather $f^1$ is enabled to slide so as to follow the displacement of the slide-rest $b$. Fixed to the front end of the driving drum $d$ is an eccentric $h$ the position of which can be adjusted and the strap of which forms a sledge $i$ moving up and down between guide bars $g$. The guide bars $g$ are connected with a crosswise moving carrier-plate $l$ posed on a bracket provided on the slide-rest $b$. Connected with the sledge $i$ is a casing $k^1$ containing the grinding disc $k$, said casing $k^1$ being horizontally movable upon the sledge $i$ so as to position the casing more or less near the crank-pin. For this purpose, the casing $k^1$ has external V-ledges $m$ which engage in corresponding grooves of the sledge $i$. A spindle $n$ with handwheel $n^1$ permits of adjustment of the casing $k^1$. The grinding disc $k$ is rotated through the intervention of the belt $o$. In the drum $d$ is fitted a drum $r$ which at one end carries the chuck $s$ for the crankshaft $t$, while the other end is fast on the spindle $p$. In the driving drum $d$ is fixed a key $u$ which engages in the longitudinal groove $v$ of the inner drum $r$, so that same as also the crankshaft $t$ participate in the rotary movement. The crankshaft $t$ fixed in the chuck $s$, has its other end centered on the pin $w$ of the puppet $z$. The shaft $s^1$ serves in moving the slide-rest $b$.

The operation of grinding the crank-pins is as follows:—

Having secured the crankshaft $t$ in the chuck $s$ and centre-pin $w$, the grinding disc $k$ is brought in contact with the crank-pin by suitably turning the handwheel $n^1$, after which the pulleys of the belts $e^2$ and $o$ are started. This will cause the belt pulley $e^3$ and toothed pinion $e^1$ to revolve and so impart rotation to the drum $d$. The eccentric $h$ turns in the up and down moving sledge $i$ upon the horizontally moving cross-sledge $l$ and thus imparts to the grinding disc $k$ a corresponding vertical and horizontal motion causing same to follow the path of the crank-pin and grinding it. By turning the handwheel $n^2$ the casing $k^1$ with its grinding disc $k$, can be adjusted. Self-feed is obtained by the action of the shaft $s^1$.

I claim:

Mechanism for grinding revolving crank-pins of a rotated crankshaft, which consists in a rotary and endwise movable cylinder, a slide-rest carrying same, an inner cylinder rotated by the rotary cylinder, means for retaining the inner cylinder from participating in the endwise motion of said rotary cylinder, a chuck carried by the inner cylinder, an eccentric connected with the front of the rotary cylinder, a vertically and horizontally movable strap for the eccentric guiding means for the eccentric strap, a horizontally displaceable casing guided on said strap, a grinding disc rotatably mounted in said casing, driving means for the grinding disc, driving means for the rotary cylinder, and self-feed for the slide-rest, all as and for the purpose stated.

AUGUST THOMAS.